US00RE44957E

(19) United States
(12) Reissued Patent
Kim

(10) Patent Number: US RE44,957 E
(45) Date of Reissued Patent: Jun. 24, 2014

(54) MONITOR CONTROL DEVICE AND CONTROL METHOD THEREOF

(75) Inventor: Young-chan Kim, Uiwang (KR)

(73) Assignee: Samsung Electronics Co., Ltd., Suwon-si (KR)

(21) Appl. No.: 10/976,329

(22) Filed: Oct. 29, 2004

Related U.S. Patent Documents

Reissue of:
(64) Patent No.: 6,473,060
Issued: Oct. 29, 2002
Appl. No.: 08/802,207
Filed: Feb. 18, 1997

(30) Foreign Application Priority Data

Feb. 17, 1996 (KR) ..... 96-3966

(51) Int. Cl.
*G09G 1/28* (2006.01)
*H04N 17/00* (2006.01)

(52) U.S. Cl.
USPC ..... 345/22; 348/177

(58) Field of Classification Search
USPC ..... 345/156, 163, 168, 169
See application file for complete search history.

(56) References Cited

U.S. PATENT DOCUMENTS

| | | | | | |
|---|---|---|---|---|---|
| 4,796,019 | A * | 1/1989 | Auerbach | 345/169 |
| 4,861,175 | A | 8/1989 | Hori et al. | |
| 5,187,469 | A | 2/1993 | Evans et al. | |
| 5,233,658 | A * | 8/1993 | Bianco et al. | 380/25 |
| 5,256,863 | A * | 10/1993 | Ferguson et al. | 235/383 |
| 5,448,697 | A * | 9/1995 | Parks et al. | 395/162 |
| 5,457,473 | A * | 10/1995 | Arai et al. | 345/10 |
| 5,550,556 | A * | 8/1996 | Wu et al. | 345/14 |
| 5,554,980 | A * | 9/1996 | Hashimoto et al. | 340/825.72 |
| 5,648,781 | A * | 7/1997 | Choi | 341/176 |
| 5,877,745 | A * | 3/1999 | Beeteson et al. | 345/156 |
| 5,943,029 | A * | 8/1999 | Ross | 345/11 |
| 6,473,060 | B1 * | 10/2002 | Kim | 345/22 |
| 7,209,116 | B2 * | 4/2007 | Gates et al. | 345/156 |

* cited by examiner

*Primary Examiner* — Duc Dinh
(74) *Attorney, Agent, or Firm* — Stanzione & Kim, LLP

(57) ABSTRACT

A monitor control device includes a monitor connected to a computer. The device displays a signal transmitted from the computer in characters or pictures of the form which can be recognized by a user. The device includes an input unit connected to the monitor, for outputting an image tune signal or a picture color tune signal and other control signals, and a controller installed in the monitor, for interpreting the control signals generated from the input unit and transmitting a monitor control signal.

79 Claims, 5 Drawing Sheets

MONITOR CONTROL DEVICE AND CONTROL METHOD THEREOF

Matter enclosed in heavy brackets [ ] appears in the original patent but forms no part of this reissue specification; matter printed in italics indicates the additions made by reissue.

CLAIM OF PRIORITY

This application makes reference to, incorporates the same herein, and claims all benefits accruing under 35 U.S.C. §119 from an application entitled MONITOR CONTROL DEVICE AND CONTROL METHOD THEREOF earlier filed in the Korean Industrial Property Office on the day of Feb. 17, 1996, and there duly assigned Serial No. 96-3966 by that Office.

BACKGROUND OF THE INVENTION

1. Field of the Invention

The present invention relates to generally to monitor control devices and processes, and, more particularly, to a monitor control device and process enabling a picture control and other controls of a monitor by using a computer peripheral device.

2. Discussion of Related Art

Contemporary designs for computers and its peripheral devices use have a monitor as one of the peripheral devices for displaying characters or pictures which can be recognized by a viewer in accordance with signals transmitted from the computer. A keyboard has a number of keys each having its own inherent signal content. Thus, if each key is input, the computer performs an operation corresponding to the input key signal. A mouse is another of the input devices for inputting signals to the computer. In contemporary practice, a number of tuning keys are installed in one side of the monitor to adjust the image or color of the picture displayed on the monitor. I have found that the number of such tuning keys that can be installed in the monitor is limited. I have also noticed that this contemporary practice is somewhat inconvenient because a complicated procedure for depressing the tuning keys must be repeated several times in order to perform multiple functions Moreover, it is inconvenient to reach for the tuning keys when the monitor is placed at some distance from a user.

SUMMARY OF THE INVENTION

Accordingly, an object of the present invention is to provide an improved monitor control device and a control method of the monitor control device.

Another object is to provide an improved monitor control device which enables a picture control and other controls of a monitor by using a computer peripheral device.

A further object is to provide a monitor control device which enables a monitor control with a key board and a mouse without the use of a picture tune key on the monitor, a monitor power switch and other functions controlling the visual display, even when the monitor is placed far away from the user and enables the transmission of the monitor information to the computer, and a control method thereof To achieve these or other objects, a monitor control device includes a monitor connected to the computer. The monitor displays the character or picture which is recognizable by the user according to the signal transmitted from the computer.

An input device is connected to the monitor, for outputting an image tune signal or a picture color tune signal and other control signals. A controller is installed in the monitor, for receiving and interpreting the control signals generated from the input device and transmitting a signal for controlling the monitor.

In another aspect, the present invention provides a method for controlling a monitor by connecting the peripheral device of a computer to the monitor, which includes the step of receiving a signal generated by the computer peripheral device at a signal receiving unit in the monitor. Other steps may be includes, such as the steps of interpreting the received signal at a signal interpretation controller to determine whether the received signal is for controlling the monitor or for being transmitted to the computer. If the received signal is for controlling the monitor, a monitor control signal can be outputted. If the received signal is for controlling the computer, a computer control signal can be outputted to the computer via a transmission line. In addition, the present invention provides a method for controlling a monitor by connecting the computer peripheral device to the monitor, which includes the steps of transmitting a monitor setting start signal via the computer peripheral device connected to the monitor, transmitting the setting state of the monitor to the computer via a transmission line connected to the computer, outputting a signal reception completion message from the computer after receiving information on the monitor, and transmitting a reset command to the monitor via the computer peripheral device to reset the environment of the monitor.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
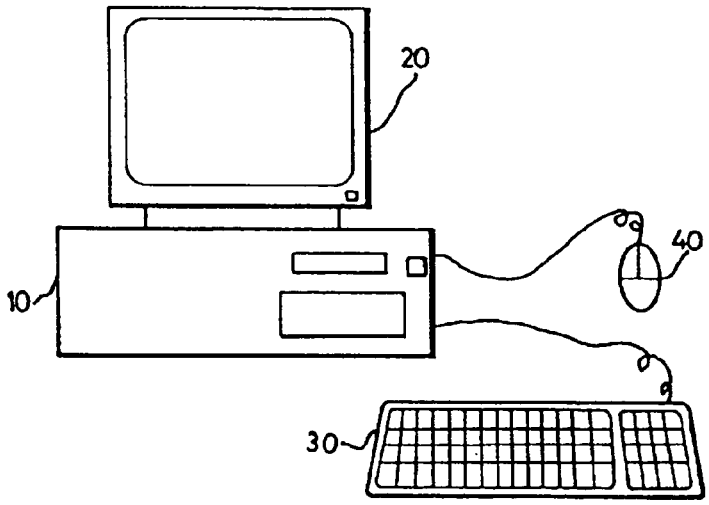
FIG. 1 is a diagram illustrating a configuration for a contemporary computer and its peripheral devices.

Turning now to the drawings, FIG. 1 shows a configuration of a contemporary computer and its peripheral devices. A monitor 20, one of the peripheral devices of a computer 10, can display characters or picture which can be recognized by a user. This is done according to the signal transmitted from the computer 10. A key board 30 has a number of keys each having its own inherent signal content. Thus, if each key is input, the computer 10 performs an operation corresponding to the input key signal. A mouse 40 is one of the input devices for inputting signals to the computer 10. Likewise, the key board 30 can be used for inputting. In a contemporary practice, a number of tune keys are installed in one side of the monitor to tune the image or color of the picture displayed on the monitor. However, the number of the tune keys which can be installed in the monitor is limited.

Figure 2:
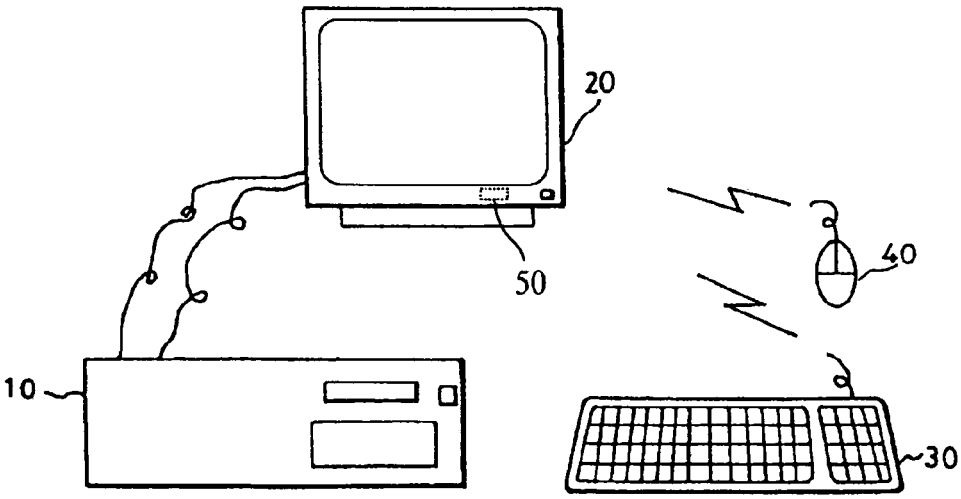
FIG. 2 is a diagram illustrating a configuration of a monitor control device constructed as a first preferred embodiment of the present invention.
Figure 3:
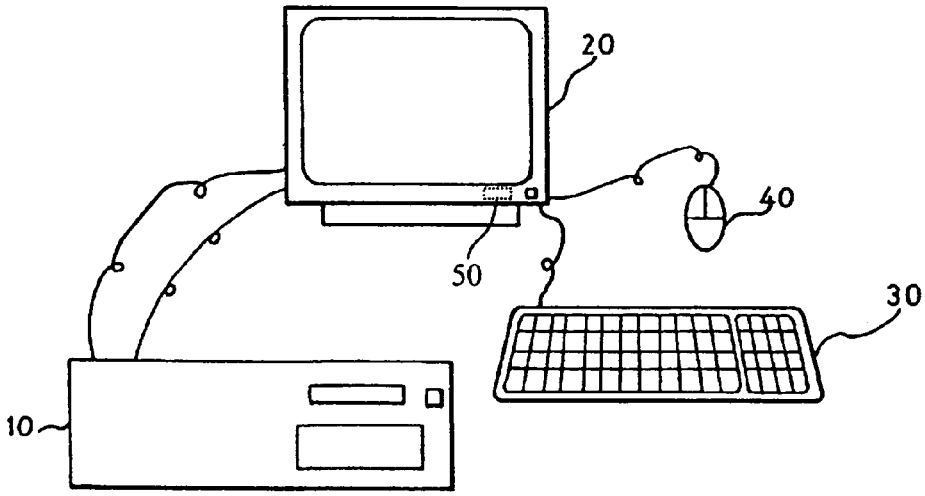
FIG. 3 is a diagram illustrating a configuration of a monitor control device constructed as a second preferred embodiment of the present invention.
Figure 4:
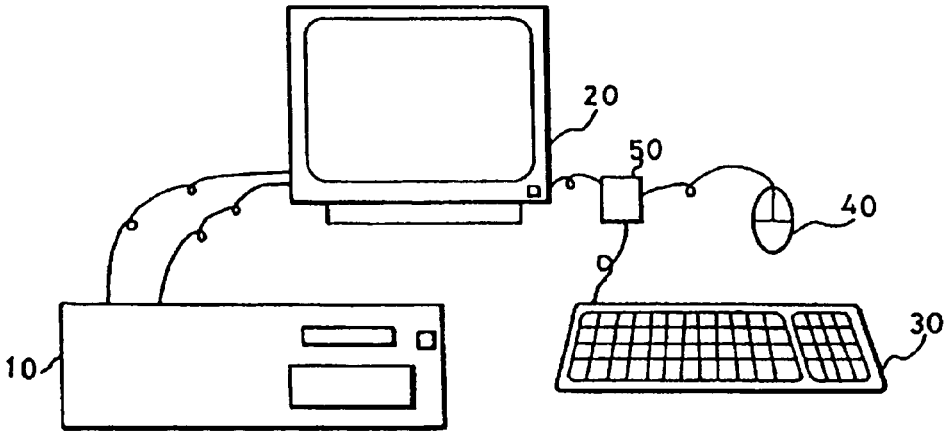
FIG. 4 is a diagram illustrating a configuration of a monitor control device constructed as a third preferred embodiment of the present invention.

Referring now to FIGS. 2 to 4, various monitor control devices according to the principles of the present invention constructed with a key board 30 and a mouse 40 that are separated from a computer 10 and can be remote-controlled. A remote-control signal receiving unit (not shown) is installed in one side of the front of the monitor, to receive the remote-control signals generated from the key board 30 and mouse 40. Referring to FIG. 3, the key board 30 and mouse 40 are not connected to the computer 10 but to the monitor 20, and two signal transmission lines are connected between the monitor 20 and the computer 10. Referring to FIG. 4, the key board 30 and mouse 40 separated from the computer 10 are connected to the monitor 20 via a controller 50.

As described above, the key board 30 and mouse 40 of the computer peripheral device are connected to the monitor 20 in various form and transmit signals. The signals are transmitted to the monitor 20 to control the monitor 20 or to the computer 10. In this case, the important feature is that the peripheral device (key board and mouse) is not connected to the computer but to the monitor. In addition, the signal generated from the computer peripheral device is determined whether it is a monitor control signal or a computer transmission signal. The controller 50 for generating a corresponding control signal according to the determination is installed inside or outside of the monitor 20.

The operation of the monitor control device according to the present invention will be discussed hereinbelow.

Referring to FIG. 2, the key board 30 which can be remote-controlled generates a signal by combination of several keys. The mouse 40 generates a signal by combination of the mouse buttons at the right and left or center thereof This generated signal is outputted via a remote-control signal transmitting unit (not shown), such as located in mouse 40. The signal output via the remote-control signal transmitting unit is transmitted to a remote-control signal receiving unit (not shown) installed in one side of the monitor 20. Thereafter, this signal is transmitted to a signal receiving unit of the controller 50 in monitor 20, for example. A signal interpreting unit determines whether the transmitted signal is a monitor control signal or an information signal to be transmitted to the computer. According thereto, a corresponding signal is generated. The control signal is transmitted to the monitor 20 and computer 10 by the signal transmitting unit of the controller 50.

In FIG. 3, the key board 30 and mouse 40 are separated from the computer 10 but connected to the monitor 20 via the transmission line, as compared with FIG. 2. Thus, the generated signal is processed by the controller 50 installed in the monitor 20.

In FIG. 4, the controller 50 is placed at the exterior of the monitor 20, thus forming a signal transmission system of the key board 30 and mouse 40 and the monitor 20.

Even though the configuration of these monitor control devices are somewhat different one to another, the operating principles thereof are similar to each other. The operation of these constructions will be discussed with reference to accompanying flow sheets shown in FIGS. 5 through 8, inclusive.

Figure 5:
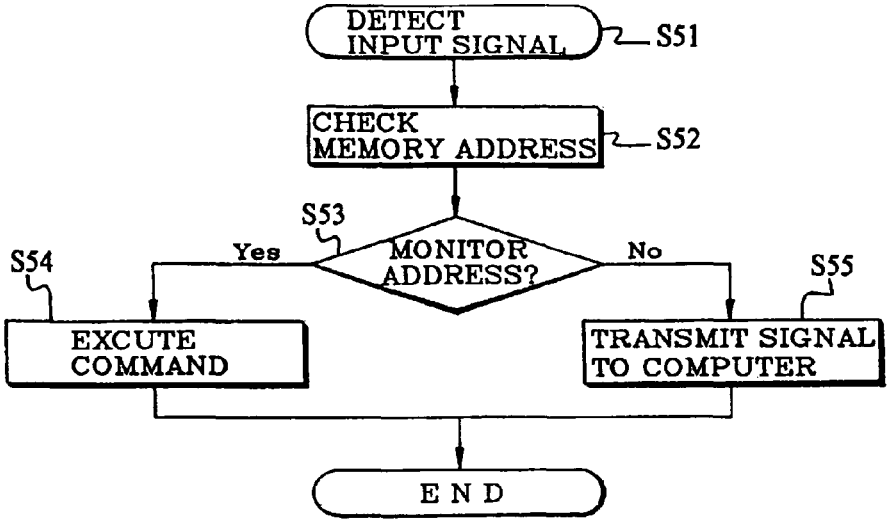
FIG. 5 is a flow chart showing a method for the practice with the monitor control device illustrated in FIG. 4.

FIG. 5 shows the operating steps of the controller 50 of FIG. 4. If a signal is input at S51, the controller 50 checks an address first at S52. If the address is its own address at S53, i.e. a monitor control signal, the controller 50 performs the command at S54. If the address is not its own address, it is transmitted to the computer at S55.

Figure 6:
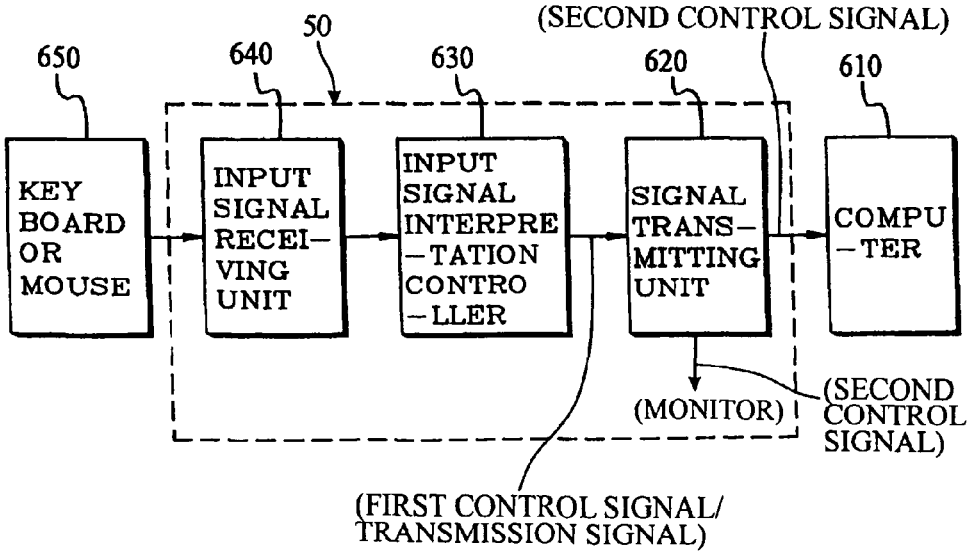
FIG. 6 is a block diagram showing a controller constructed according to the principles of the present invention.

FIG. 6 shows an internal configuration of the monitor including controller 50 to which the present invention is applied. The input signal receiving unit 640 receives a signal from the key board, mouse or the remote-controlled key board or mouse; hence the input unit 650 of FIG. 6 can be a keyboard 30 or a mouse 40. The controller 630 interprets the signal transmitted via the input signal receiving unit, such as a monitor control signal to be transmitted to a monitor or an information signal to be transmitted to the computer, and then performs the command. The signal transmitting unit 620 respectively transmits the input signal or the command result of the controller to the computer 610 or to the monitor 20.

Figure 7:
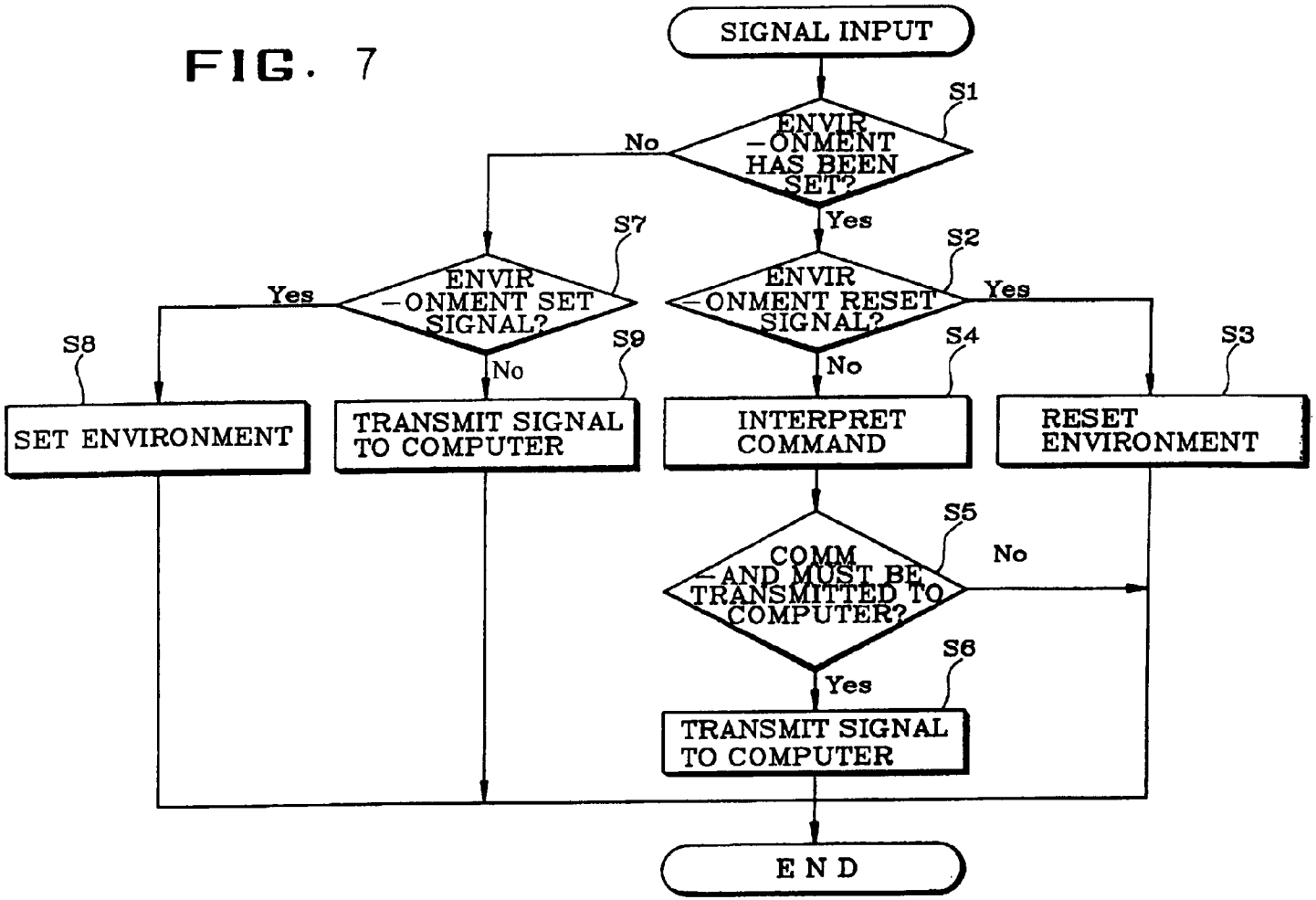
FIG. 7 is a flow chart showing a process for controlling a visual monitor according to the principles of the present invention.

The operation of the present invention will be discussed with reference to the flow sheet of FIG. 7. If a signal is input, the controller of the monitor checks in step S1 if an environment of the monitor has been set. If the environment has not been set, the controller checks in step S7 if the input signal is an environment set signal. If the input signal is an environment set signal, the controller sets the environment of the monitor in step S8, and if not, transmits the signal to the computer in step S9. If it is checked in step S1 that the environment has been set, the controller checks in step S2 if the input signal is an environment reset signal. If the input signal is an environment reset signal, the controller resets the environment in step S3 and if not, interprets the command in step S4. After the interpretation, the controller determines if the command needs to be transmitted to the computer in step S5 and then transmits it to the computer in step S6 or completes the procedure.

Figure 8:
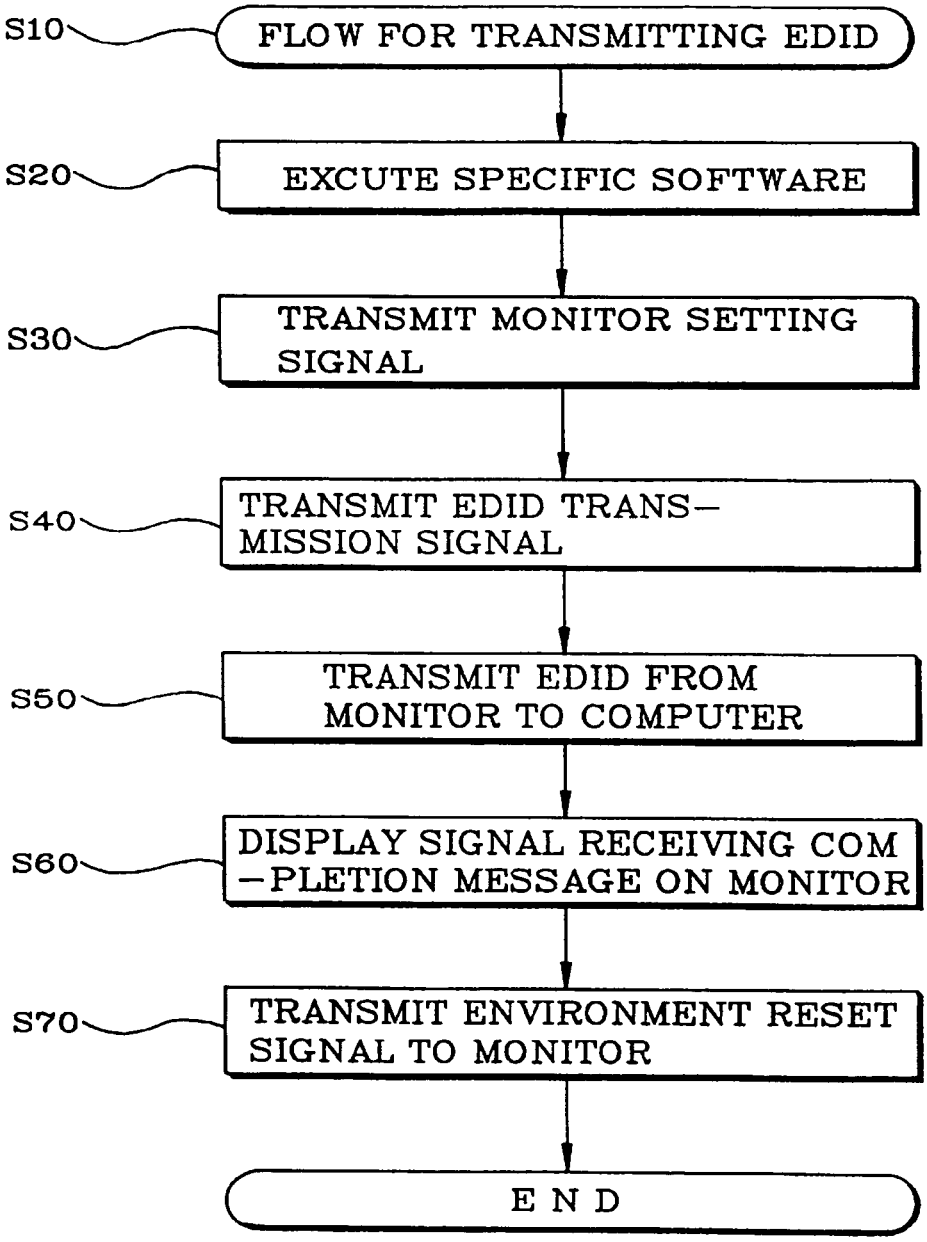
FIG. 8 is a flow chart showing a process for transmission of extended data in accordance with the principles of the present invention.

Meanwhile, the monitor can transmit various data of the computer peripheral device to the computer by using a specific input signal, and the operating procedure thereof will be discussed hereinbelow with reference to the flow chart of FIG. 8. The procedure is performed on the assumption that a specific software must be previously driven in step S20 before transmitting an EDID (Extended Display Identification Data). With this software, the computer can perceive that the data to be input thereafter is the EDID. After execution of the software, the user transmits a monitor environment setting signal to the monitor by using the key board or the mouse in step S30. Thereafter, the user transmits the command for transmitting the EDID in step S40. After receiving this command, the monitor transmits the EDID to the computer in step S50. After receiving all EDID, the computer displays a signal receiving completion message on the monitor in step S60. The user transmits an environment reset signal to the monitor by using the key board or the mouse in step S70.

In summary, the present invention includes the steps of receiving the signal generated by the computer peripheral device at the signal receiving unit in the monitor; interpreting the received signal to determine whether it is a signal for controlling the monitor or a signal to be transmitted to the computer; and if the received signal is a signal for controlling the monitor, outputting the monitor control signal and if the received signal is a signal for controlling the computer, outputting the computer control signal to the computer via the transmission line.

In addition, the method of transmitting the monitor setting state to the monitor and resetting the monitor state has the steps of transmitting a monitor setting start signal via the computer peripheral device connected to the monitor; transmitting data on the setting state of the monitor to the computer via the transmission line connected to the computer; displaying a signal receiving completion message by the computer after receiving the data on the monitor; and transmitting a monitor environment reset command to the monitor by using the computer peripheral device to reset the environment of the monitor.

As described above, without using several tune switches installed in outer surface of the monitor, the present invention can achieve the same effect as the case of using them. That is, the monitor can be controlled by connecting the computer peripheral device thereto, without the use of the tune switches. Thereby, the manufacturing costs and additional steps required in manufacturing can be remarkably reduced. Further, it is possible to control the power by adjusting the power switch of the monitor and computer, using the transmission line connected between the monitor and the computer.

It will be apparent to those skilled in the art that various modifications and variations can be made in the monitor control device of the present invention without departing from the spirit or scope of the invention. Thus, it is intended that the present invention cover the modifications and variations of this invention provided they come within the scope of the appended claims and their equivalents.

What is claimed is:

[1. A device for controlling to control a monitor, comprising;

a computer;

a monitor connected to said computer for displaying to display variable visual images corresponding to a computer signal transmitted from said computer as characters and pictures recognizable to a user;

an input unit for generating an image tune signal indicating preferences on image, a picture color tune signal indicating preferences on picture color, and a computer control signal; and a controller separate from said computer for communicating with said monitor, said controller for interpreting signals generated and received from said input unit, for selectively transmitting a monitor control signal for controlling said monitor to set preferences for display of said variable visual images on said monitor and for selectively transmitting said computer control signal to said computer.]

[2. The device of claim 1, wherein said input unit comprises a mouse.]

[3. The device of claim 1, wherein said input unit comprises a keyboard.]

[4. The device of claim 1, wherein said controller comprises:

a signal receiving unit for receiving a received signal transmitted from said input unit;

a signal interpreting unit for interpreting the received signal to determine whether the received signal is a signal for controlling said monitor or a signal to be transmitted to said computer and then for transmitting a first control signal and a transmission signal; and a signal transmitting unit for transmitting a second control signal according to an instruction from said signal interpreting unit, the instruction determining whether the second control signal is to be sent by said controller to said monitor or said computer.]

[5. The device of claim 4, wherein said input unit comprises a mouse.]

[6. The device of claim 4, wherein said input unit comprises a keyboard.]

[7. The device of claim 1, wherein said controller is installed in said monitor and said controller comprises:

a signal receiving unit for receiving a received signal transmitted from said input unit;

a signal interpreting unit for interpreting the received signal to determine whether the received signal is a signal for controlling said monitor or a signal to be transmitted to said computer and then for transmitting a first control signal and a transmission signal; and a signal transmitting unit for transmitting a second control signal according to an instruction from said signal interpreting unit, the instruction determining whether the second control signal is to be sent by said controller to said monitor or said computer.]

[8. The device of claim 7, wherein said input unit comprises a mouse.]

[9. The device of claim 7, wherein said input unit comprises a keyboard.]

[10. The device of claim 7, wherein said input unit comprises a remote-control signal transmitting unit, and said monitor comprises a remote-control signal transceiving unit in a predetermined portion to receive and transmit a signal generated from said remote-control signal transmitting unit to said controller.]

[11. The device of claim 10, wherein said input unit comprises a mouse.]

[12. The device of claim 10, wherein said input unit comprises a keyboard.]

[13. The device of claim 1, wherein said input unit comprises a remote-control signal transmitting unit, and said monitor comprises a remote-control signal transceiving unit in a predetermined portion to receive and transmit a signal generated from said remote-control signal transmitting unit to said controller.]

[14. The device of claim 13, wherein said input unit comprises a mouse.]

[15. The device of claim 13, wherein said input unit comprises a keyboard.]

[16. A method for controlling a monitor, comprising the steps of:

receiving a first signal generated from an input unit at a signal receiving unit communicating with a controller, said controller communicating with a monitor;

interpreting said first signal at said controller to determine whether said first signal is one of a signal for controlling said monitor and a signal to be transmitted to a computer, said controller being separate from said computer;

when said first signal is a signal for controlling said monitor, transmitting by said controller a monitor control signal to control said monitor, and when said first signal is a signal for controlling said computer, transmitting by said controller a computer control signal to said computer transmitting display identification data from the monitor to the computer in response to a monitor environment setting signal transmitted from the input unit separate from the controller to the monitor.]

[17. A method for setting an environment of a monitor, comprising the steps of:

transmitting data to set an environment of a monitor from a computer peripheral device to a controller communicating with a monitor executing a software program to permit a computer to adjust to said data transmitted from said computer peripheral device, said controller being separate from said computer, setting through said controller an environment of said monitor based upon said data transmitted from said computer peripheral device and transmitting said data transmitted from said computer peripheral device through said controller to said computer;

after said computer receives the said data transmitted from said computer peripheral device, informing a user of a completion of data reception via said monitor; and transmitting a reset signal to reset through said controller the environment of said monitor based upon said data transmitted from said computer peripheral device.]

*18. A device to control a monitor, comprising:*

*a computer;*

*a monitor connected to said computer to display variable visual images corresponding to a computer signal transmitted from said computer as characters and pictures recognizable to a user;*

*an input unit to generate a monitor control signal including at least one of an image tune signal indicating preferences on image and a picture color tune signal indicating preferences on picture color and to generate a computer control signal; and*

*a controller separate from said computer to communicate with said monitor and to directly receive the monitor control signal or computer control signal from the input unit, said controller to interpret whether signals generated and received from said input unit include the monitor control signal or the computer control signal, to selectively transmit the monitor control signal directly to said monitor to control said monitor to set preferences for display of said variable visual images on said monitor, to selectively transmit said computer control signal to said computer, and to control the monitor to transmit display identification data to the computer in response to a monitor environment setting signal transmitted from the input unit separate from the controller to the monitor,*

*wherein the controller directly transmits the received computer control signal to the computer.*

*19. The device of claim 18, wherein said input unit comprises a mouse.*

*20. The device of claim 18, wherein said input unit comprises a keyboard.*

*21. The device of claim 18, wherein said controller comprises:*

*a signal receiving unit to receive a received signal transmitted from said input unit;*

*a signal interpreting unit to interpret the received signal to determine whether the received signal is a signal to control said monitor or a signal to be transmitted to said computer and then to transmit a first control signal and a transmission signal; and*

*a signal transmitting unit to transmit a second control signal according to an instruction from said signal interpreting unit, the instruction determining whether the second control signal is to be sent by said controller to said monitor or said computer.*

*22. The device of claim 21, wherein said input unit comprises a mouse.*

*23. The device of claim 21, wherein said input unit comprises a keyboard.*

*24. The device of claim 18, wherein said controller is installed in said monitor and said controller comprises:*

*a signal receiving unit to receive a received signal transmitted from said input unit;*

*a signal interpreting unit to interpret the received signal to determine whether the received signal is a signal to control said monitor or a signal to be transmitted to said computer and then to transmit a first control signal and a transmission signal; and*

*a signal transmitting unit to transmit a second control signal according to an instruction from said signal interpreting unit, the instruction determining whether the second control signal is to be sent by said controller to said monitor or said computer.*

*25. The device of claim 24, wherein said input unit comprises a mouse.*

*26. The device of claim 24, wherein said input unit comprises a keyboard.*

*27. The device of claim 24, wherein said input unit comprises a remote-control signal transmitting unit, and said monitor comprises a remote-control signal transceiving unit in a predetermined portion to receive and transmit a signal generated from said remote-control signal transmitting unit to said controller.*

*28. The device of claim 27, wherein said input unit comprises a mouse.*

*29. The device of claim 27, wherein said input unit comprises a keyboard.*

*30. The device of claim 18, wherein said input unit comprises a remote-control signal transmitting unit, and said monitor comprises a remote-control signal transceiving unit in a predetermined portion to receive and transmit a signal generated from said remote-control signal transmitting unit to said controller.*

*31. The device of claim 30, wherein said input unit comprises a mouse.*

*32. The device of claim 30, wherein said input unit comprises a keyboard.*

*33. A method to control a monitor, the method comprising:*

*receiving a first signal generated from an input unit at a signal receiving unit communicating with a controller, said controller communicating with a monitor such that the controller directly receives the first signal from the input unit;*

*interpreting said first signal at said controller to determine whether said first signal is one of a signal to control said monitor and a signal to be transmitted to a computer, said controller being separate from said computer;*

*when said first signal is a signal to control said monitor, transmitting by said controller directly to said monitor a monitor control signal to control said monitor, and when said first signal is a signal to control said computer, transmitting by said controller a computer control signal to said computer; and*

*transmitting display identification data from the monitor to the computer in response to a monitor environment setting signal transmitted from the input unit separate from the controller to the monitor,*

*wherein the controller directly transmits the received computer control signal to the computer.*

*34. A method for setting an environment of a monitor, comprising the steps of:*

*transmitting data to set an environment of a monitor from a peripheral device to a controller communicating with a monitor such that the controller directly receives the data from the peripheral device;*

*executing a software program to permit a computer to adjust to said data transmitted from said peripheral device, said controller being separate from said computer;*

*setting through said controller an environment of said monitor based upon said data transmitted from said peripheral device and transmitting display identification data from the monitor through said controller to said computer in response to a monitor environment setting signal transmitted from the peripheral device separate from the controller to the monitor;*

*after said computer receives the display identification data transmitted from the monitor, informing the user of a completion of data reception via said monitor; and*

*transmitting a reset signal to reset through said controller the environment of said monitor based upon said data transmitted from said peripheral device.*

*35. A method of controlling a display apparatus, the method comprising:*

*receiving, by the display apparatus, a command to set an environment of the display apparatus or a computer control signal from a peripheral device such that the display apparatus directly receives the command from the peripheral device;*

*setting the environment of the display apparatus according to the command to set the environment of the display apparatus in response to the display apparatus receiving the command to set the environment of the display apparatus from the peripheral device, and transmitting the computer control signal to a computer in response to the display apparatus receiving the computer control signal from the peripheral device; and*

*transmitting display identification data from the display apparatus to the in response to a monitor environment setting signal transmitted from the peripheral device separate from the controller to the monitor,*

*wherein the display apparatus directly transmits the received computer control signal to the computer.*

*36. The method according to claim 35, wherein the display identification data includes extended display identification data (EDID).*

*37. The method according to claim 35, wherein the peripheral device comprises a keyboard.*

*38. The method according to claim 35 wherein the peripheral device comprises a mouse.*

*39. A display apparatus comprising:*

*a controller to receive a command to set an environment of the display apparatus or a computer control signal directly from a peripheral device, to set the environment of the display apparatus according to the command to set the environment of the display apparatus in response to the controller receiving the command to set to the environment of the display apparatus from the peripheral device, to transmit the computer control signal to a computer in response to the controller receiving the computer control signal from the peripheral device, and to transmit display identification data to a software program executed in the in response to a monitor environment setting signal transmitted from the peripheral device separate from the controller to the monitor,*

*wherein the controller directly transmits the received computer control signal to the computer.*

*40. The display apparatus according to claim 39, wherein the peripheral device comprises a keyboard.*

*41. The display apparatus according to claim 39, wherein the peripheral device comprises a mouse.*

*42. A display apparatus comprising:*

*a display;*

*a peripheral device outputting a signal; and*

*a controller built in the display apparatus, the controller receives a signal including at least one of a display environment setting signal and a computer control signal directly from the peripheral device, sets an environment of the display according to the display environment setting signal in response to receiving the display environment setting signal from the peripheral device, transmits the computer control signal to the computer in response to receiving the computer control signal, and controls the display to transmit display identification data to the computer in response to a monitor environment setting signal transmitted from the peripheral device separate from the controller to the monitor,*

*wherein the controller directly transmits the received computer control signal to the computer.*

*43. The display apparatus according to claim 42, wherein the controller comprises:*

*a signal receiving unit to receive the signal including at least one of the display environment setting signal and the computer control signal from the peripheral device;*

*a signal interpreting unit to convert the computer control signal received through the signal receiving unit into a signal transmittable to the computer; and*

*a signal transmitting unit to transmit the computer control signal converted by the signal interpreting unit to the computer.*

*44. The display apparatus according to claim 43, wherein the signal interpreting unit determines whether the signal received through the signal receiving unit includes the display environment setting signal, and the signal transmitting unit transmits the display environment setting signal from the signal interpreting unit to the display when the signal received through the signal receiving unit is determined as including the display environment setting signal.*

*45. The display apparatus according to claim 42, wherein the peripheral device comprises a keyboard.*

*46. The display apparatus according to claim 42, wherein the peripheral device comprises a mouse.*

*47. A method of controlling a display apparatus, the method comprising:*

*receiving in a controller at least one of a display setting signal and an information signal transmitted directly from a peripheral device;*

*setting an environment of the display apparatus in response to receiving the display setting signal;*

*transmitting the information signal from the peripheral device to a computer through the controller separated from the computer and connected to the display apparatus in response to receiving the information signal; and*

*transmitting a display identification data signal from the display apparatus to the computer in response to a monitor environment setting signal transmitted from the peripheral device separate from the controller to the monitor,*

*wherein the controller directly transmits the received information signal to the computer.*

*48. The method according to claim 47, wherein the transmitting the information signal from the peripheral device to the computer comprises:*

*converting the information signal transmitted from the peripheral device into a signal transmittable to the computer; and*

*transmitting the converted signal to the computer.*

*49. A method of controlling a computer display, the method comprising:*

*providing a signal generated by an external device to a display controller;*

*receiving at least one of a display setting signal and an information signal transmitted from a peripheral device such that the controller directly receives the at least one of the display setting signal and the information signal from the peripheral device;*

*setting an environment of the computer display in response to receiving the display setting signal;*

*transmitting the information signal from the peripheral device to the external device through the display controller in response to receiving the information signal; and*

*transmitting display identification data from the computer display to the external device in response to a monitor environment setting signal transmitted from the peripheral device separate from the controller to the monitor,*

*wherein the controller directly transmits the received information signal to the external device.*

*50. The method of claim 49, wherein the external device comprises a computer.*

*51. The method of claim 50, wherein the signal is generated by a software program executed in the computer.*

*52. The method of claim 50, wherein the display controller can receive a remote-control signal.*

*53. The method of claim 50, wherein the display setting signal includes information to control the computer display and the information signal includes information to control the computer.*

*54. A display control device to control a display of a computer, comprising:*

*a remote control unit to generate and transmit a signal including at least one of a display environment setting signal and an information signal to be transmitted to the computer; and*

*a display controller provided in the display to receive the generated signal directly from the remote control unit, to set an environment of the display according to the display environment setting signal in response to receiving the display environment setting signal from the remote control unit, to send the information signal to the computer in response to receiving the information signal from the remote control unit, and to control the display to transmit display identification data to the computer in response to a monitor environment setting signal transmitted from the remote control unit separate from the controller to the monitor,*

*wherein the controller directly transmits the received information signal to the computer.*

*55. The display control device of claim 54, wherein the remote control unit comprises:*

*a remote control signal generating unit to generate the signal; and*

*a remote control transmitting unit to transmit the generated signal to the display controller.*

*56. The display control device of claim 54, wherein the remote control unit transmits the generated signal to the display controller through a wire and/or a radio signal.*

*57. The display control device of claim 54, wherein the display controller comprises a signal interpreting unit to determine whether the transmitted signal includes the display environment setting signal or the information signal to be transmitted to the computer.*

*58. The display control device of claim 56, wherein the remote control unit is a keyboard and/or a mouse.*

*59. A monitor comprising:*

*a controller having signal receiving unit to receive a control signal directly from a peripheral device; and*

*a signal interpreting unit to determine whether the received control signal is a monitor environment control signal or an information signal to be transmitted to a computer, to set an environment of the monitor according to the received control signal when it is determined that the received control signal is the monitor environment control signal, to transmit the received control signal to the computer when it is determined that the received control signal is the information signal, and to transmit display identification data to the computer in response to a monitor environment setting signal transmitted from the peripheral device separate from the controller to the monitor,*

*wherein the signal interpreting unit directly transmits the received control signal to the computer.*

*60. The monitor of claim 59, wherein the received control signal comprises a signal to control picture color and tuning of the monitor.*

*61. The monitor of claim 59, wherein the peripheral device comprises a keyboard.*

*62. The monitor of claim 59, wherein the peripheral device comprises a mouse.*

*63. An apparatus to control a monitor, comprising:*

*a monitor to display an image; and*

*a controller having an input signal receiving unit to receive a first input signal and a second input signal directly from an input unit, and a signal transmitting unit to transmit the first input signal to the monitor when the first input signal is a monitor control signal to set an environment of the monitor, to transmit the second input signal to a computer when the second input signal is an information signal to be transmitted to the computer, and to control the monitor to transmit display identification data to the computer in response to a monitor environment setting signal transmitted from the signal transmitting unit separate from the controller to the monitor,*

*wherein the controller directly transmits the received second input signal to the computer.*

*64. The apparatus of claim 63, wherein the input unit comprises:*

*one of a keyboard and a mouse connected to the controller to generate the first input signal and the second input signal.*

*65. The apparatus of claim 63, wherein the computer is connected to the signal transmitting unit of the controller to receive the second input signal.*

*66. The apparatus of claim 63, wherein the controller is mounted to an inside of the monitor.*

*67. The apparatus of claim 63, wherein the controller is electrically connected to the monitor to transmit the first input signal to the monitor.*

*68. The apparatus of claim 63, wherein the controller is electrically connected to the computer to transmit the second input signal to the computer.*

*69. The apparatus of claim 63, wherein the monitor and the controller are formed in a single body, and the computer is separated from the single body.*

*70. The apparatus of claim 63, wherein the controller prevents the first input signal from being transmitted to the computer.*

*71. The apparatus of claim 63, wherein the monitor controls a monitor environment according to the first input signal.*

*72. The apparatus of claim 63, wherein the computer outputs a control signal corresponding to the second input signal received through the controller, and the monitor displays the image according to the control signal received from the computer.*

*73. A method of setting an environment of a display apparatus, the method comprising:*

*receiving a computer control signal or an environment setting signal in a controller of the display apparatus directly from a peripheral device;*

*setting the environment of the display apparatus according to the environment setting signal received directly from the peripheral device without transmitting the environment setting signal to an external device;*

*transmitting the computer control signal to a computer in response to the display apparatus receiving the computer control signal from the peripheral device; and*

*transmitting display identification data from the display apparatus to the external device in response to the environment setting signal transmitted from the peripheral device separate from the controller to the display apparatus.*

*74. The method according to claim 73, wherein the display identification data comprise extended display identification data (EDID).*

*75. The method according to claim 73, wherein the external device comprises a computer.*

*76. The method according to claim 75, wherein said setting the environment of the display apparatus comprises controlling picture color based on the environment setting signal.*

*77. The method according to claim 73, wherein said setting the environment of the display apparatus comprises controlling tuning of the display apparatus based on the environment setting signal.*

*78. A display apparatus comprising:*

*a controller to receive a signal including at least one of a computer control signal and an environment setting signal to set an environment of the display apparatus directly from a peripheral device, to set the environment of the display apparatus according to the environment setting signal without transmitting the environment setting signal to a computer, to transmit the computer control signal to the computer in response to receiving the computer control signal and to control the display apparatus to transmit display identification data to the computer in response to the environment setting signal transmitted from the peripheral device separate from the controller to the display apparatus.*

*79. The display apparatus according to claim 78, wherein the peripheral device comprises at least one of a keyboard and a mouse.*

*80. The display apparatus according to claim 78, wherein the display identification data comprises extended display identification data (EDID).*

*81. The display apparatus according to claim 80 wherein the peripheral device transmits the environment setting signal to set the environment of the display apparatus to the controller.*

*82. A method of controlling a display input device, the method comprising:*

*receiving a signal in a controller transmitted directly from the display input device;*

*determining whether the signal is a monitor control signal or an information signal to be transmitted to a computer;*

*if it is determined that the signal is the monitor control signal, setting an environment of a display apparatus according to the monitor control signal;*

*if it is determined that the signal is the information signal, transmitting the signal from the display input device to the computer through the controller separated from the computer and connected to the display apparatus; and*

*transmitting display identification data from the display apparatus to the computer in response to the monitor environment setting signal transmitted from the display input device separate from the controller to the display apparatus,*

*wherein the controller directly transmits the received information signal to the computer.*

*83. The method according to claim 82, wherein the transmitting the signal from the display input device to the computer comprises:*

*converting the signal transmitted from the display input device into a signal transmittable to the computer; and*

*transmitting the converted signal to the computer.*

*84. The method according to claim 82, wherein the display input device comprises a keyboard.*

*85. The method according to claim 82, wherein the display input device comprises a mouse.*

*86. An apparatus comprising:*

*a monitor;*

*an input device including a keyboard and/or a mouse;*

*a computer; and*

*a controller disposed in the monitor, the controller to receive a first signal to set an environment of the monitor directly from the input device without transmitting the first signal to the computer and to transmit a second signal including display identification data to the computer in response to a monitor environment setting signal transmitted from the input device separate from the controller to the monitor,*

*wherein the controller directly transmits the received second signal to the computer.*

*87. The apparatus according to claim 86, wherein the display identification data comprises extended identification data (EDID).*

*88. The apparatus according to claim 86, wherein the monitor comprises a microprocessor executing at least one of predetermined functions including a control function about the extended identification data (EDID).*

*89. The apparatus according to claim 88, wherein the controller is provided as a functional part of the microprocessor.*

*90. The apparatus according to claim 88, wherein the microprocessor communicates with the controller and sets the environment of the monitor based on the first signal.*

*91. The apparatus according to claim 90, wherein the controller includes a software program executed in the computer.*

*92. The apparatus according to claim 88, wherein the controller comprises:*

*a signal receiving unit to receive the first signal transmitted from the input device;*

*a signal interpreting unit to convert the first signal received through the signal receiving unit into a signal transmittable to the computer; and*

*a signal transmitting unit to transmit the signal converted by the signal interpreting unit to the computer.*

*93. The display apparatus according to claim 92, wherein the signal interpreting unit determines whether the first signal received through the signal receiving unit includes a signal to control the monitor, and the signal transmitting unit transmits*

*the first signal from the signal interpreting unit to the monitor when the signal received through the signal receiving unit is determined as the signal to control the monitor.*

*94. An apparatus to control a monitor communicating with a peripheral device and a computer, comprising:*

*an input signal receiving unit to receive a signal directly from the peripheral device;*

*a signal interpreting unit to determine whether the received signal includes a monitor control signal or an information signal to be transmitted to the computer; and*

*a signal transmitting unit to transmit the received signal to the monitor if it is determined that the received signal includes the monitor control signal, to transmit the received signal to the computer if it is determined that the received signal includes the information signal, and to control the monitor to transmit display identification data to the computer in response to a monitor environment setting signal transmitted from the peripheral device separate from the controller to the monitor,*

*wherein the controller directly transmits the received signal to the computer.*

*95. The apparatus of claim 94, wherein the signal transmitting unit exclusively transmits the monitor control signal to the monitor and the information signal to the computer.*

*96. The apparatus of claim 94, wherein the monitor controls a monitor environment according to the monitor control signal.*

* * * * *